Figure 1:
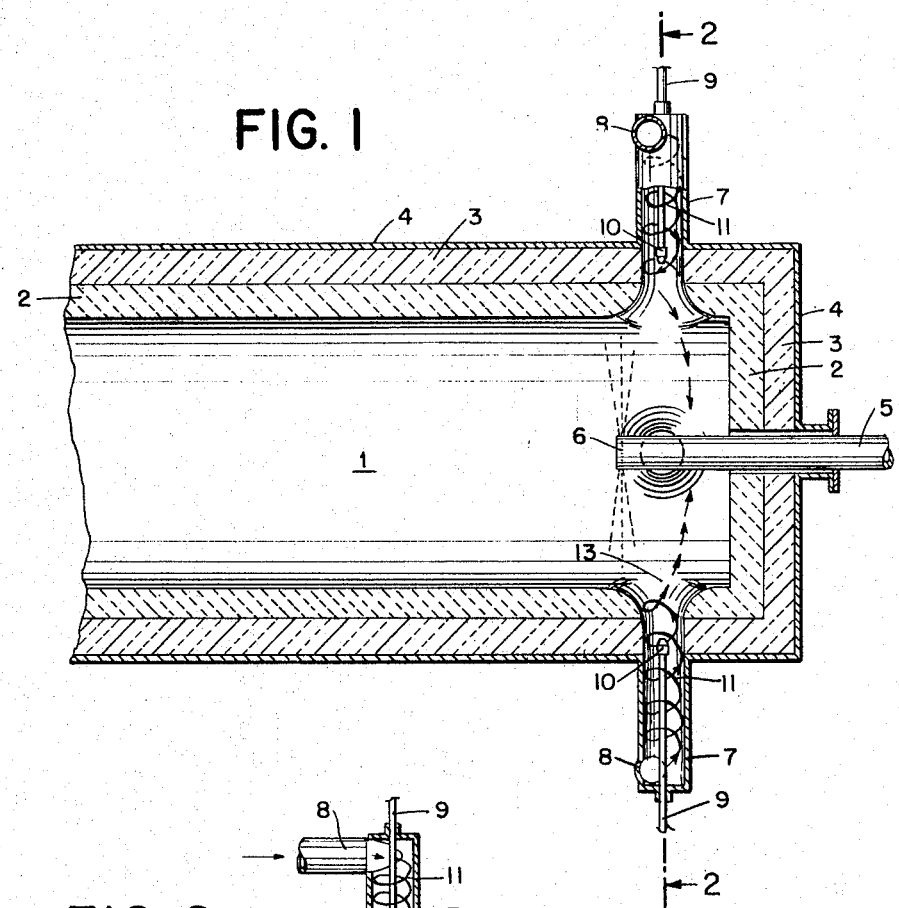

Jan. 31, 1967 C. L. DE LAND 3,301,639
METHOD AND APPARATUS FOR THE MANUFACTURE OF CARBON BLACK
Filed March 20, 1963 3 Sheets-Sheet 1

INVENTOR
CHARLES L. DeLAND
BY
ATTORNEYS

Jan. 31, 1967   C. L. DE LAND   3,301,639
METHOD AND APPARATUS FOR THE MANUFACTURE OF CARBON BLACK
Filed March 20, 1963   3 Sheets-Sheet 3

INVENTOR
CHARLES L. DeLAND
BY
ATTORNEYS

United States Patent Office 3,301,639
Patented Jan. 31, 1967

3,301,639
METHOD AND APPARATUS FOR THE MANU-
FACTURE OF CARBON BLACK
Charles L. De Land, West Monroe, La., assignor to Columbian Carbon Company, New York, N.Y., a corporation of Delaware
Filed Mar. 20, 1963, Ser. No. 266,747
14 Claims. (Cl. 23—209.4)

This invention relates to the manufacture of carbon black by the thermal decomposition of hydrocarbons and relates more particularly to improvements in process and apparatus whereby the hydrocarbon to be decomposed to carbon black, herein referred to as "make" or "hydrocarbon make," is decomposed by heat absorbed from hot combustion gases within a furnace chamber to form carbon black in suspension in the furnace gases from which the carbon black is subsequently separated and collected.

The invention provides improvements in the method and means for establishing and maintaining and controlling the nature of the hot combustion gases within the furnace chamber whereby the yield of carbon black may be substantially increased and the characteristics of the resultant carbon black markedly influenced and controlled.

Extensive research has been carried out in an effort to produce carbon blacks embodying particular properties, or particular combinations of properties, desirable in the use for which the carbon black is intended. It is known that the characteristics of a carbon black are largely influenced by the environment in which the carbon black is formed. It is known, for instance, that the characteristics of a carbon black are influenced by the rapidity with which the hydrocarbon make is mixed with the hot combustion gases, the degree of turbulence, and the temperature and composition of the gases within the reaction zone.

In one well-known process of the general type described, a combustible mixture of a fuel gas and air is injected at high velocity into one end of a cylindrical elongated furnace chamber through a plurality of tangentially positioned burner tubes and burned as it enters the chamber to form a stream of hot combustion gases flowing through the chamber at high velocity along a helical path and the hydrocarbon make is injected either radially or longitudinally into the hot gas stream.

In another process, there is generated within a vertically-elongated chamber a body of hot combustion gases which rises slowly upwardly through the chamber as a relatively quiescent, "lazy" stream and the hydrocarbon make is injected vertically into this gas stream.

Each of these processes has its limitations as to the characteristics and yields of the carbon black produced and as to optimum operating conditions. Operations of the type just described, in which the hot combustion gases are generated by burning of the combustible mixture tangentially injected into the furnace chamber, have been characterized by exteremely high velocity and high turbulence of the hot gases in the zone of reaction, tending to result in carbon blacks of relatively small particle size. In operations of this sort, it has been impractical to reduce greatly the velocity of the incoming combustible gases, and the high degree of turbulence created within the furnace chamber, without detrimentally affecting combustion efficiency, due to incomplete mixing of the fuel and air. Accordingly, though processes of this type have been found highly valuable, their application has been somewhat limited to the production of certain types of carbon black.

As previously indicated, the type of operation just described has been found especially useful where rapid mixing of the make with the combustion gases is desirable. Also, by this procedure, there is formed within the furnace chamber a high velocity, swirling, helically-flowing stream of hot gases adjacent the furnace wall and diminishing in velocity as the center line of the furnace is approached, a condition conducive to the forming of certain types of carbon black.

It has been found desirable to effect a better control of gas velocities, turbulence and compositions in operations of this general type. But efforts in that direction have been confronted by many practical difficulties. For instance, the heat requirements of the process must be met, both as to quantity and degree or temperature, which tends to fix the volume of hot combustion gases charged to, or generated within, the furnace chamber. Requirements as to the nature of the hot gases, i.e., oxidizing, neutral or reducing, must also be met. Further, precautions must be taken to avoid flash-backs or explosions in the burner. All of these and other practical considerations have tended to make more difficult the adjustment of the velocity, turbulence and composition of the hot combustion gases spiraling through the furnace chamber.

In accordance with the present invention, the gas velocities and turbulence within the furnace chamber, in operations of this type, can be controlled independently of temperature, volume and composition of the combustion gases. The invention makes possible the establishing and utilization of a rotating annular blanket of hot gases in the furnace chamber in operations in which low turbulence and relatively slow mixing are required as well as in operations in which controlled high turbulence and rapid mixing are desired.

The invention has the further advantage that in accordance therewith one may produce a revolving gas blanket which is much more uniform than that produced by tangential injection of the gas streams and appears as a revolving, continuous cylinder or annulus adjacent the chamber wall and having a relatively quiescent inner core, the speed of revolution and diameter of the inner core being subject to control, as herein described.

This invention is predicated upon my discovery of novel method and means for establishing, maintaining and controlling a highly efficacious atmosphere of hot gases within the reaction zone of a carbon black furnace and whereby the said hot gases are caused to spin or rotate at controlled velocity and turbulence to effect any desired rate of mixing of the hydrocarbon make with the hot gases.

As distinguished from establishing rotational motion of the hot gases within the furnace chamber by the injection of a gas stream along an axis positioned tangentially with respect to said chamber, in accordance with the prior art, the rotational motion is established and maintained in accordance with the present invention by introducing into one end of the furnace chamber a spiraling stream of gases along a path the axis of which is directed to intersect the longitudinal axis of the furnace chamber and so positioning the flight and direction of the gas spiral as it enters the furnace chamber that the momental direction of the predominant segment of the entering gas is substantially to one side of the furnace axis and thereby causing the hot gases to rotate about the furnace axis.

This spiraling gas stream is, with advantage, developed in, and passed to the furnace chamber through an axially-extending cylindrical tube or chamber which may have, though not necessarily, the function of a burner tube or tunnel. For convenient reference herein, I shall refer to this chamber as a "burner chamber" but it will be understood, as just indicated, that combustion does not necessarily occur therein. As a matter of fact, preformed hot gases may be charged tangentially into the outer end of the burner chamber so as to form the spiraling gas stream therein. However, it is presently preferred to effect the combustion largely or entirely within the furnace chamber or at the exit end of the burner chamber, as hereinafter more fully described.

The invention contemplates the use of either a single burner chamber or a plurality of such chambers, the spiraling flow through each being synchronized so that the momental direction of the predominant segment of the exit gas of each spiraling stream, or a majority of such streams, is to the same side of the furnace axis so that the aggregate influence is to effect the rotation of the gases within the furnace chamber in the desired direction.

The outer end of the burner chamber is closed by an end wall while the discharge end opens freely into the furnace chamber. I presently prefer to construct the juncture with the furnace chamber so as to provide a symmetrically outwardly flaring bell-shaped or conical exit. However, such discharge cone is not essential and where desired the cylindrical burner chamber may be of uniform diameter throughout its length.

Where combustion is to be effected within the furnace chamber, or at the juncture of the burner chamber with the furnace chamber, it is usually desirable to produce the spiraling gas stream by injecting air, or other oxidizing gas, tangentially into the outer end of the burner chamber and to pass a fluid fuel through a confining conduit extending coaxially through the burner chamber and equipped with a spray nozzle at its inner end adapted to promote mixing of the fuel with the swirling air stream. Though not restricted to that method of operation, the invention will be further described and illustrated with respect to that aspect thereof.

Figure 2:
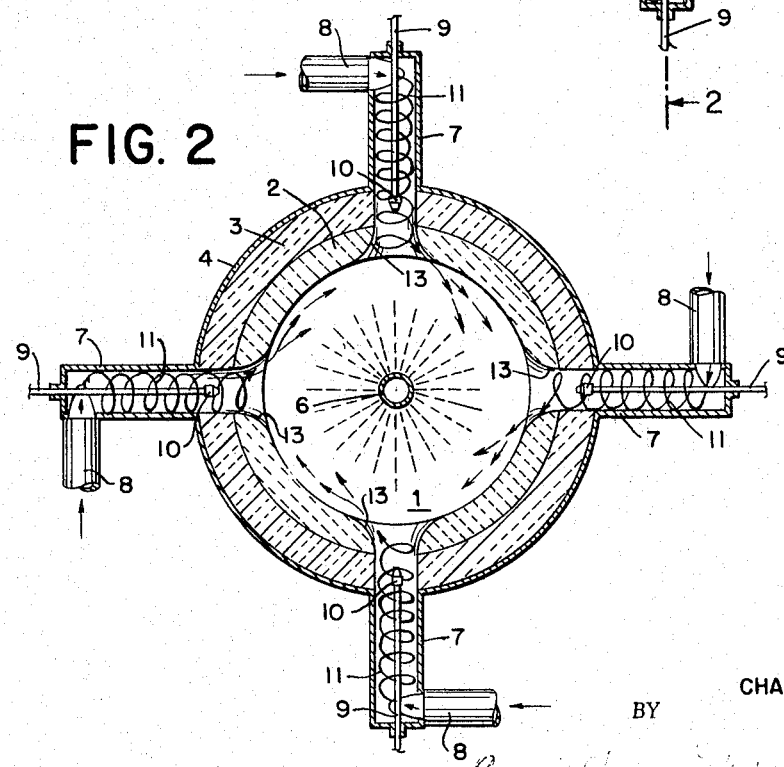
Figure 3:
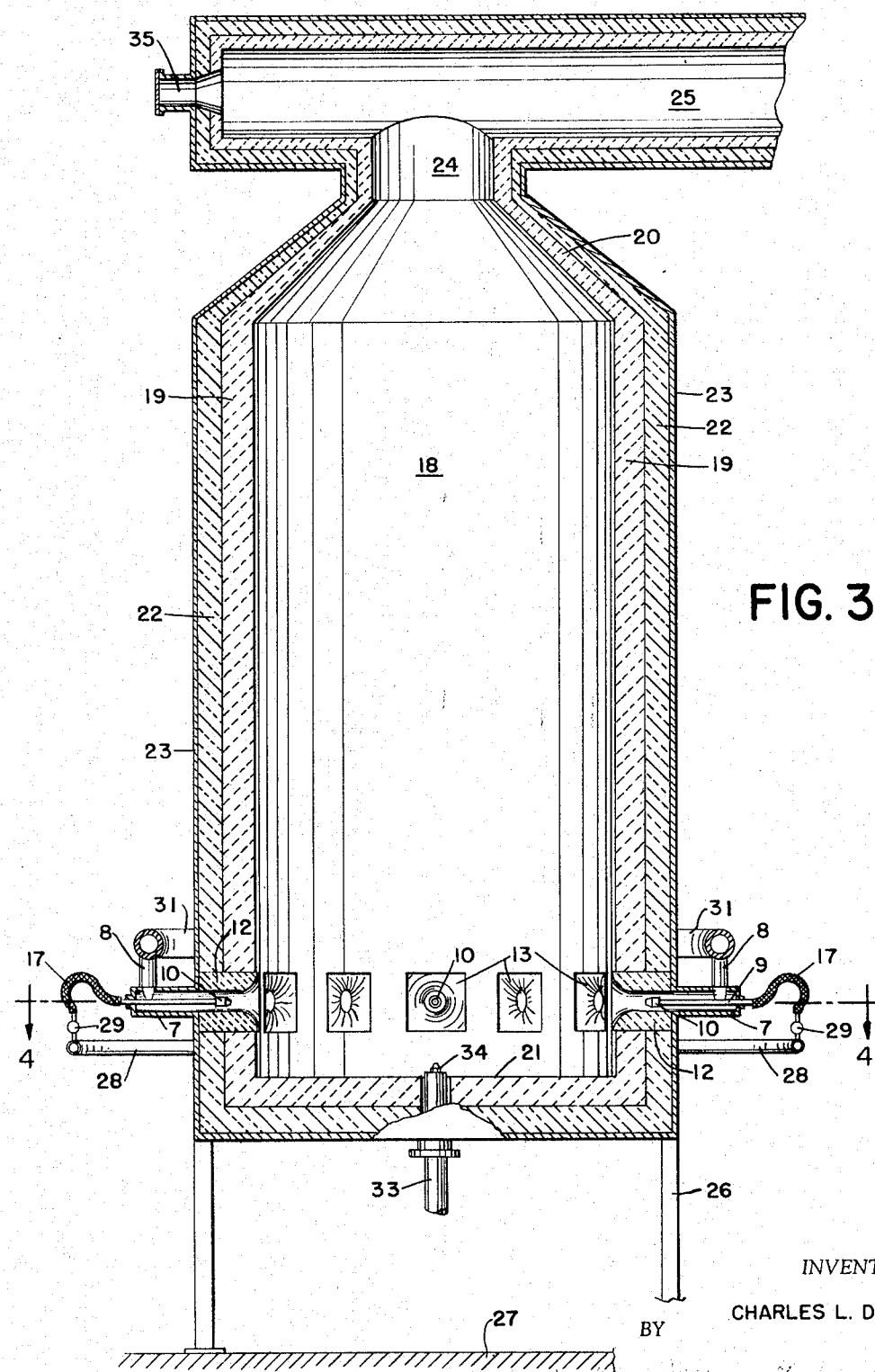
Figure 4:
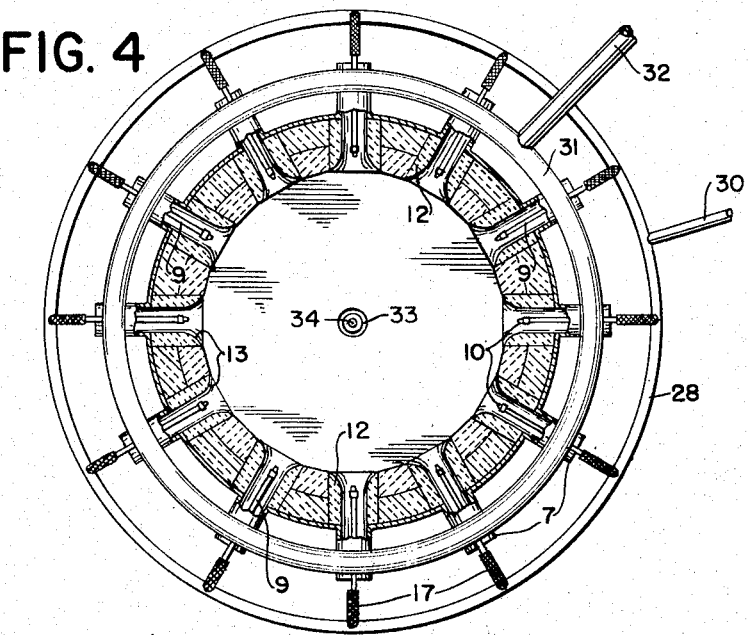
Figure 5:
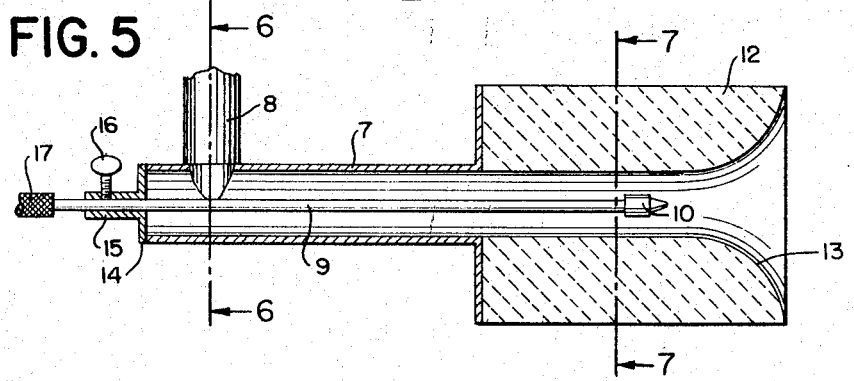
Figure 6:
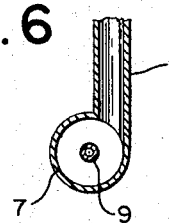
Figure 7:
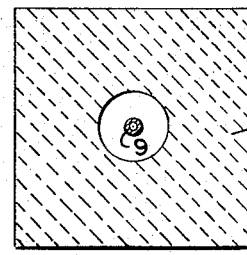

The invention and its utility will be better understood from the following description of illustrating embodiments thereof with reference to the accompanying drawings which represent apparatus especially adapted to the carrying out of the process and of which FIG. 1 represents, somewhat fragmentarily and diagrammatically, the upstream end of a horizontally elongated furnace chamber of circular cross-section, FIG. 2 is a sectional view along the line 2—2 of FIG. 1, FIG. 3 is a vertical section of a vertically elongated furnace, FIG. 4 is a cross-sectional view along the line 4—4 of FIG. 3, FIG. 5 is a more detailed and somewhat enlarged vertical section of a burner chamber assembly, FIG. 6 is a sectional view along the line 6—6 of FIG. 5, and FIG. 7 is a sectional view along the line 7—7 of FIG. 5.

Referring to FIGS. 1 and 2 of the drawings, an elongated reaction chamber, or furnace chamber, is represented at 1 having a circular cross-section and delineated by refractory walls 2 covered by layer 3 of thermal insulation and all encased in a metal shell 4. The hydrocarbon make is introduced into the furnace chamber through a make injector represented at 5 extending coaxially through the upstream furnace end wall, terminating at its inner end in a spray nozzle 6 of conventional type and advantageously water-cooled to prevent overheating, as well understood by the art.

Entering the furnace chamber at its upstream end are four cylindrical burner chambers 7 extending radially with respect to the furnace chamber and equally spaced about the circumference of said furnace chamber.

Each of the cylindrical burner chambers is provided adjacent its outer end with an inlet conduit 8 for air, or other oxidizing gas, opening into the burner chamber tangentially with respect to the delineating side wall thereof so as to form within the burner chamber a helically flowing gas stream. Each burner chamber is also provided with a fuel injector conduit 9 extending coaxially through the outer end wall of the burner chamber and through the chamber and terminating in a fuel nozzle 10. Advantageously, this fuel injection conduit is supported by the end wall of the burner chamber and is adapted to slide longitudinally therethrough, as more fully illustrated in FIG. 5 of the drawings, so that the position of the fuel nozzle 10 may be adjusted with respect to the conical discharge exit 13 of the burner chamber.

The air stream injected tangentially into the burner chamber, and following a helical path therethrough, is diagrammatically represented by the lines 11. It will be recognized that it is extremely difficult, if not impossible, to map the precise path of these gases, but it is known that they follow a helical or spiraling path through the chamber 7 and that, upon release from the confining wall of chamber 7, the gases enter the furnace chamber in an unsymmetrical pattern. In other words, the gases escaping from the confinement of chamber 7 through one segment of the discharge exit, or cone, are predominant.

One may think of this helical stream as a corkscrew, the point of which is at the exit of chamber 7 and on escaping from the confining walls, the major portion of the gases tend to continue in the direction of the point of the "corkscrew." Thus by adjusting the helical stream so that the point of the "corkscrew" is aimed in the required direction, the momentum of the dominant segment of entering gases is imparted to the body of gases within the furnace chamber causing them to rotate about the furnace chamber axis.

The particular segment of the exit of chamber 7 through which the greater mass of the spiraling gas discharges into the furnace chamber may be established in several ways but is conveniently accomplished by reducing or increasing the length of chamber 7, i.e., the distance between the entrance of tangential inlet 8 and the discharge outlet of the chamber. For instance, by increasing or reducing this distance by one-half the pitch of the spiraling gas stream, that segment of the exit gases which predominates may be moved about 180° from the angular position previously occupied. Alternatively, the pitch of the spiral may be changed by any of the means well known to the art, e.g., by adjusting the angle of entry of conduit 8.

The volume of the selected cone segment, i.e., discharge segment, occupied by the dominant portion of the discharging gases may be regulated by varying the volume of gas charged to chamber 7. For instance, the greater the ratio of gas volume to cross-sectional area of chamber 7, the greater the angle subtended by the selected segment. By use of the expedients just described, the direction and momentum of the entering gas may be regulated and controlled.

It will be appreciated that where a plurality of burner chambers is employed, as shown for instance in the apparatus represented by the drawings, the dominant momental directions of each entering gas stream may be coordinated so that they cooperate to promote rotation of the furnace gases in the same direction, or one or more of the entering gas streams may be adjusted to oppose others. In this way, turbulence and speed of rotation of the furnace gases may be accurately controlled and regulated.

In carrying out the process in the apparatus just described, air and fuel gas may be supplied to the system, as previously indicated, at measured predetermined rates. The fuel nozzle 10 may be so positioned with respect to the conical outlet of chamber 7 as to cause the mixing and combustion of the gas-air mixture to be substantially completely accomplished within chamber 7 or in the conical discharge therefrom. In another particularly advantageous embodiment of the invention, the nozzle 10 may be of such nature and so positioned with respect to the discharge end of chamber 7 that mixing and combustion are not completed within the zone just described but at least a portion of the fuel discharged from the nozzle 10 is projected toward the hydrocarbon make spray issuing from the spray nozzle 6. In this manner, the entering make may be shielded by the fuel gas and thereby protected from reaction with unreacted free oxygen supplied for burning the fuel.

In each of these embodiments of the invention just described, a rotating body of hot combustion gases is formed within chamber 1 as a vortex, i.e., the gases adjacent the chamber wall 2 spin at a substantially higher rate of speed than the gases which occupy space in the immediate proximity of the furnace chamber axis.

The hydrocarbon make may be introduced into the furnace chamber through the spray head 6, either radially outwardly, as shown, or as an expanding cone, so that the atomized droplets are vaporized by heat absorbed from the hot gases, with the vapors being carried into the combustion gases which are rapidly spinning near the chamber wall 2. Alternatively, the hydrocarbon make may be discharged from the spray head 6 in a substantially longitudinal direction directly into the center or core of the vortex. Thus, through utilization of the invention, a wide range of operating conditions can be established within the furnace chamber to influence the characteristics of the resultant carbon black to meet the many requirements of the industry.

In each of its applications, the hydrocarbon make is thermally decomposed to carbon black within the furnace chamber 1 by heat absorbed from the rotating body of hot combustion gases maintained within the furnace chamber and is removed from the chamber in suspension in the combustion gases and gaseous by-products formed by the thermal decomposition of the hydrocarbon make. The resultant aerosol is passed from the furnace to any conventional system for separating carbon black from a gaseous medium, such as cyclone separators, electrostatic precipitators or bag filters.

A burner chamber-burner assembly which may, with advantage, be used in accordance with the present invention is represented by FIGS. 5, 6 and 7 of the drawings. In addition to the elements previously described, the assembly shown comprises a cast refractory burner block 12, the discharge end of which is symmetrically outwardly flared or bell-shaped as indicated at 13. The outer end of the chamber 7 is closed by end plate 14 to which there is secured, as by welding, an outwardly extending sleeve 15 for supporting the fuel conduit 9 and through which conduit 9 is free to move longitudinally for adjusting the position of the fuel nozzle 10 which may be secured in the desired position by means of set screw 16. To permit this adjustment, the outer end of conduit 9 may be connected through flexible connection 17 to any convenient source of fluid fuel. The air conduit 8 enters the chamber 7 in a tangential direction, as more clearly shown in FIG. 6. The gas refractory burner block 12 provides effective and convenient means for securing the assembly in place in the furnace wall.

In place of air as the oxidizing gas, other free oxygen containing gas or combustion supporting gaseous media may be used to form the spiraling gas stream passing through the chamber 7 for mixing with the fluid fuel. Where desirable, and where conditions permit, a gaseous fuel, for instance natural gas, may be passed to the assembly through conduit 8 to form the spiraling gas stream in chamber 7 and air or other combustion supporting gas may be introduced through the conduit 9. Or as previously noted, preformed hot combustion gases at the required temperature to decompose the hydrocarbon make to carbon black may be charged to the assembly through conduit 8, in which case conduit 9 and spray head 10 may be omitted from the assembly.

Though various modifications of the invention are possible, we have found particular advantage in positioning nozzle 10 adjacent to or within the discharge cone or bell 13 so that mixing and burning of the fuel and the oxygen-containing gas is accomplished largely in the interior of the furnace chamber rather than in the chamber 7.

As previously described herein, the spiraling gas stream formed in chamber 7 emerges from the flared discharge cone 13 in a direction more or less radial with respect to chamber 7. However, these gases are not discharged in a uniform pattern, i.e., a greater mass of the outwardly flowing gases passes through a selected segment of the cone. In other words, the radial discharge of the air, for instance, from the cone is unsymmetrical so that the momentum of the discharging stream is not evenly distributed and is greater in one particular direction, this direction being subject to control and regulation as hereinbefore described.

It is thus possible to establish or select the segment of the cone through which the bulk of the spiraling gases discharge and it is also possible, within limits, to control the volume of the segment and consequently momental magnitude, as well and momental direction, of the gases entering the furnace, so that the gases within the furnace chamber may be caused to rotate about the chamber axis at controlled velocity and turbulence.

The invention also contemplates operations in which additional gases may be introduced into the furnace chamber by method and means other than those of the present invention and the gases within the furnace chamber, from whatever source, are caused to rotate by injecting only a part thereof as herein provided.

An especially advantageous embodiment of the invention will be described with reference to FIGS. 3 and 4 of the drawings. This particular aspect of the invention is especially applicable to processes of the general type described in U.S. Patents Nos. 2,779,665, and 3,003,855 and in copending application Ser. No. 207,494, filed July 5, 1962, in accordance with which the process is carried out in a vertically elongated furnace chamber in which there is established and maintained a relatively quiescent, slowly upwardly rising body of hot furnace gases into which the hydrocarbon make is introduced vertically and coaxially. This invention provides method and means for causing either slow, moderate or relatively rapid rotation of the furnace gases within such chambers while providing other furnace atmosphere conditions as required for producing a carbon black having the desired characteristics.

In FIGS. 3 and 4 of the drawings, a vertically elongated furnace chamber 18 is delineated by vertically positioned cylindrical wall 19 of furnace refractory, tapering at its upper end, as indicated at 20, and closed at its lower end by floor wall 21, all covered by a layer of thermal insulation 22 and encased in a metal jacket 23. The upper end of the chamber is connected through vent 24 with breeching 25, which may be similarly insulated and jacketed, and leads to a conventional cooling and carbon black separation system. The structure may be supported, for instance, by metal legs 26 and concrete foundation 27.

Twelve assemblies, such, for instance, as illustrated by FIGS. 5, 6 and 7 of the drawings, are uniformly spaced about the periphery of the chamber at its lower end, the fluid fuel being charged to the fuel conduits 9 through bustle pipe 28 and flexible connections 17 at a rate controlled by valves 29, the fuel being supplied to the bustle pipe from any convenient source through connection 30. Air is tangentially supplied to the chambers 7 through tangentially entering conduits 8 from bustle pipe 31 supplied through conduit 32.

The hydrocarbon make is injected vertically upwardly into the furnace chamber 18 through conduit 33, advantageously water-cooled to protect against overheating, and terminating in spray nozzle 34.

In some cases, it is desirable to alter the properties of the carbon black passing in suspension through breeching 25 by mixing with the suspension a treating gas, for instance additional hot products of combustion or an oxygen-containing gas, and these may be introduced where desired through an auxiliary duct 35.

In operations of this type, I have found it especially desirable that the fuel nozzle 10 be so positioned that the combustible mixture is formed, at least in part, within the furnace chamber 18 and burned therein to produce a rotating body of flame adjacent the series of discharge cones. After the furnace has been preheated, preferably to a temperature between 1600° and 2700° F., the hydrocarbon make, at a constant and measured rate, is sprayed upwardly into the body of rotating combustion gases generated by the revolving flame. Advantageously, the make spray nozzle 34 is of a type which cast a cone of liquid droplets, the cone having a wide included angle, but in no case should the liquid droplets contact the chamber walls 19. The included angle of the cone may be narrowed, however, when it is desired to cast the droplets higher into the furnace in order to reduce the volume of the furnace chamber 18 utilized in the carbon forming reaction.

In this type of operation, sufficient velocity should be imparted to the hydrocarbon make spray droplets to carry them significantly high up into the furnace chamber 18 to assure that they are vaporized by heat absorbed from the hot gases before falling to the furnace floor 21. Ideally, the upward velocity at which all constituents rise within the furnace chamber, should be sufficiently low to permit the relatively heavy hydrocarbon make vapors to descend downwardly toward the floor of the furnace while being decomposed to carbon black. On the other hand, this velocity should be sufficiently high to convey the suspended carbon black particles, resulting from the decomposition, upwardly and outwardly from the chamber through the exit vent 24 at a relatively constant rate. The optimum velocity to be maintained will depend upon several permissively variable operating factors, but I have found velocities within the range from about 5 to about 15 feet per second to be suitable in most cases.

In particular advantageous operations of this type, I have used as the hydrocarbon make a heavy, highly aromatic residue of petroleum obtained from a cracking operation. As described in the above-noted patents and copending application, the make is propelled well up into the vertical furnace chamber by spraying to form a pattern of upwardly rising vapors and vaporizing droplets. The upward momentum is soon lost however, and as the vapors and droplets are sufficiently heavy, they fall back through the chamber, wherein they decompose while passing through the lighter and upwardly rising vapors and gases.

Vaporization of the hydrocarbon droplets occurs rapidly, since the temperature of the furnace gases is well above the boiling point of the hydrocarbon make and is maintained sufficiently high, in fact, to thermally decompose the hydrocarbon vapors into carbon black as they rise and fall within the chamber. Before the vapors can fall to the chamber floor their transformation into carbon black is completed. The resultant carbon is of a very light and flocculent nature and is readily entrained by the upwardly rising gases and is carried thereby out of the furnace chamber through the vent 24.

As a result of this phenomena, there is formed within the furnace chamber a smoke cloud or "blanket" comprising the rising gases of combustion and decomposition, carbon black, and rising droplets from the make spray and falling vapors of the hydrocarbon make. I have applied the method of my present invention, for creating the hot combustion gases, in operations of the type just described and have found that the characteristics of the resultant carbon black may be advantageously affected by the particular type of turbulence created within the "blanket" by the rotation imparted thereto. Also, especially advantageous results have been obtained by employing the previously described method of shielding the spray of hydrocarbon make droplets from reaction with oxygen, i.e., shielding said spray with a portion of the fuel introduced into the furnace chamber.

While those processes of the previously noted patents and application are well suited, respectively, for producing carbon blacks having unusually high and low structural development, the present invention may be applied to a vertical furnace to impart a rotary motion to the smoke blanket while shielding the make droplets from combustion to provide combined effects which permit the manufacture of more normally structured carbon blacks at amazingly high rates and yields.

In employing this previously described burner arrangement with a vertical furnace, it is possible to avoid contact between the hydrocarbon make and the combustion gases while imparting a rotary motion to the blanket. These effects may be accomplished by discharging either hot combustion gases, or a combustible mixture, or a constituent thereof into the vertical furnace chamber after the manner previously described, so that hot combustion gases are caused to rotate adjacent the furnace chamber wall while rising toward the top of the furnace. By spraying the hydrocarbon make axially and upwardly into the center of the furnace, contact with the hot gases may be substantially avoided, at least until the hydrocarbon has been subjected to partial pyrolysis. The yield of carbon black from the feedstock may be considerably increased, since interaction of the feedstock with oxygen furnished to the combusion mixture may be greatly reduced.

The spiraling motion imparted to the incoming combustion gases is conveyed to the "blanket" within the furnace chamber and causes it to revolve about the vertical axis of the chamber. Sufficient turbulence may be created in this manner to assure a thorough commingling of the blanket constituents to effect a more rapid and uniform thermal decomposition of the hydrocarbon make to form the carbon black and reducing gases. Since the turbulence is of a regular and orderly nature, the carbon forming process is unusually smooth, may be easily reproduced, and is sufficiently stable to permit significant variations in the properties of the carbon black produced. The presently described methods for conducting vertical furnace operations also permit thermal decomposition of the feedstock hydrocarbons to form high quality carbon blacks at far higher rates and yields than was possible with previous methods in which the decomposition was accomplished within a quiescent "blanket."

The height at which the bottom boundary of the "blanket" is maintained above the outlet of the make spray 34 is variable and affords one means whereby the carbon black properties, particularly oil absorption, may be regulated. If the atomized hydrocarbon make is allowed to commingle with the air-fuel mixture, or with hot combustion gases containing free oxygen, before the make droplets enter the "blanket," the resultant oil absorption of the carbon black will be higher than when such commingling is prevented. It is possible, within limits, to adjust the oil absorption of the carbon black by controlling contact between these gases and the entering make. When the lower boundary of the "blanket" is maintained near the tip of the make spray 34, the effect of lowering oil absorption is greatest, and increasing the distance may increase the oil absorption, but within limits. The atmosphere pressure within chamber 18 may be precisely regulated by means of a throttling damper and a suction fan located within the collection unit, not shown, and if the chamber is operated under a slight vacuum, the bottom of the blanket may be maintained well above the spray head. Increasing the pressure moves the "blanket" downward, and it is possible to immerse the tip of the make spray completely within the blanket so that this effect on lowering oil absorption is greatest.

One advantage in employing the previously described burner arrangement in conjunction with the vertical furnace operation is, as previously noted, its capability of propelling a portion of the fuel into the make spray pattern while the air is projected somewhat radially from the outlet of the conduits 9. Thus when a series of such burners is used about the circumference of the furnace chamber at the level of the tip of the make spray, it is possible to utilize a rather slowly cracking fuel, such as natural gas, to surround the hydrocarbon make droplets and form a protective shield which further prevents reaction of the make with unreacted oxygen from the combustible mixture or the combustion gases formed therefrom. Not only may the carbon black properties be additionally controlled in this manner, but the yield of carbon black from the make hydrocarbon may be substantially increased.

Practically any normally liquid or readily liquefied hydrocarbon may be used as the make in accordance with this invention, but there are particular advantages in using highly aromatic residues and tars of petroleum, coal, and the like, especially those having an aromatic content of at least 65%, a molecular weight within the range from about 100 to 400 and a UOP characterization factor (K) within the range from about 9 to 10.5.

In forming the combustible mixtures which are burned to create hot combustion gases, air, oxygen, or combinations thereof may be employed as the free oxygen containing gas. Either gaseous or normally liquid hydrocarbons may be used as the fluid fuel, but other gases such as carbon monoxide or hydrogen may be used by suitable modification of the operation.

The invention and advantages derived therefrom will be further illustrated by the following specific examples of its application to operations carried out in a vertical furnace of the type just described. It will, of course, be understood that the scope or application is not restricted to these illustrative embodiments thereof.

Example I

The carbon forming operation was conducted within a vertical furnace apparatus of the type shown in the drawings. The inner diameter of the furnace chamber was 8.5 feet and its height was 20 feet in the cylindrical section. Ten burner assemblies were spaced at equal distances around the furnace chamber on a circumferential center line 18 inches above the furnace floor. Each burner comprised a cylindrical burner chamber through which air was introduced into the furnace chamber, and each of these conduits was aligned along an axis which perpendicularly intersected the veritical center line of the furnace chamber. The internal diameter of these burner chambers was 5 inches and their length was 19 inches. Each chamber terminated in a flared discharge cone which diverged over a distance of 4.5 inches to an outlet diameter of 13 inches. Air at the rate of 21,900 SCFH was supplied to each conduit through a single tangentially entering conduit having a cross-sectional area of 6.25 square inches. Natural gas was supplied into the furnace chamber through conduits and spraying nozzles coaxially positioned within the burner chambers. Each spraying nozzle had a single discharge orifice of 5/16 inch through which natural gas was projected axially at the rate of 1920 SCFH. The discharge orifice of each nozzle was located within the discharge cone of its respective burner about 3 inches from its outlet into the furnace chamber.

Air was discharged radially and unsymmetrically from each burner, whereupon a portion of the natural gas discharged from the spraying nozzles mixed therewith to form a revolving ring of flame which generated a rotating and upwardly rising body of combustion gases within the furnace chamber. Another portion of the natural gas supplied from the spraying nozzles traveled inwardly toward the vertical center line of the furnace chamber to surround and mix with the solid cone of hydrocarbon make droplets injected axially and upwardly into the chamber from a single make spray having a single discharge orifice recessed one inch below the level of the furnace floor. The inner diameter of the make spray discharge orifice was 5/32 inch and the cone of droplets projected therefrom had an included angle of about 75 degrees. The make hydrocarbon was a petroleum residue which was preheated to 350° F. and sprayed into the furnace chamber at the rate of 363 gallons per hour. The properties of the petroleum residue are listed in the following table.

Table 1

ASTM TESTS

| | |
|---|---|
| API gravity | 1.1 |
| Index of refraction | 1.659 |
| Molecular weight | 306 |
| Viscosity SSU at 130° F. | 359.5 |
| Viscosity SSU at 210° F. | 63.5 |

CALCULATED PROPERTIES

| | |
|---|---|
| UOP–K Factor | 10.13 |
| BMCI | 117.0 |
| Mean average boiling point, ° F. | 810 |
| Specific gravity | 1.0671 |

ULTIMATE ANALYSIS

| | Percent |
|---|---|
| Carbon | 88.25 |
| Hydrogen | 8.22 |
| Sulfur | 1.89 |
| Ash | 0.05 |
| Other | 1.59 |

The petroleum residue was vaporized and thermally decomposed within the furnace chamber to form a "blanket" which rotated about the vertical axis of the chamber. Rotation of the "blanket" created turbulence therein which caused a thorough commingling of the make vapors and the hot reducing gases of the blanket. The lower boundary of the blanket was maintained about 6 inches to 12 inches above the furnace floor.

The temperature of the furnace chamber was maintained over a range of about 2550° F. near the bottom of the chamber to about 2050° F. near the tapered top section.

Carbon black was produced within the furnace chamber at the rate of 2203 pounds per hour, and it is notable that this amounted to a yield of 6.07 pounds of carbon black from each gallon of make hydrocarbon fed into the furnace. Upon examination, it was found that the carbon black so produced possessed a tinting strength of 56% of a standard FF carbon black, a Stiff Paste Oil Absorption value of 16 gallons per hundred pounds, and an ASTM Iodine Adsorption value of 33.

Example II

In this operation, the furnace, auxiliary apparatus, and operating conditions were the same as in Example I, except as herein noted: Air at the rate of 44,000 SCFH was supplied to each burner, while natural gas was supplied thereto at the rate of 3860 SCFH. The discharge orifices of the fuel spraying nozzles were 3/8 inch in diameter and were located within the discharge cones about 1 inch from the outlets of the latter into the furnace chamber.

The air was radially and unsymmetrically discharged from the burners in order that the fuel might be utilized as in Example I to surround the droplets injected upwardly into the furnace from the make spray and to produce a spiraling ring of flame and combustion gases. In this case the discharge orifice of the make spray had a diameter of 13/64 inch and projected a solid cone of droplets having an included angle of about 75 degrees. The make hydrocarbon was the same petroleum residue of Example I and was preheated to about 350° F. before being injected into the furnace chamber at the rate of 726 gallons per hour.

The hydrocarbon make vaporized and decomposed within the furnace chamber forming a rotating "blanket" of hot reducing gases with which the make vapor commingled and was thereby thermally decomposed to form carbon black. The lower boundary of the blanket was maintained about 6 inches to 12 inches above the furnace floor.

The temperature of the furnace chamber was maintained over a range of about 2600° F. in the vicinity of the floor to about 2350° F. near the tapered top section.

Carbon black was produced at the rate of 4138 pounds per hour, and therefore provided a yield of 5.8 pounds of carbon black from each gallon of hydrocarbon make injected into the furnace. The carbon black was examined and found to have about the same properties as in Example I.

I claim:

1. In the process for producing carbon black in a cylindrical furnace chamber by the thermal decomposition of hydrocarbons by heat absorbed from a rotating body of hot combustion gases passing through said cylindrical furnace chamber, the method of inducing the rotational motion of said hot gases which comprises introducing into one end of the furnace chamber a spiraling stream of gases along a path the axis of which is directed to intersect the longitudinal axis of the furnace chamber and so positioning the flight and direction of the gas spiral as it enters the furnace chamber that the momental direction of a predominant segment of the entering gases is substantially to one side of the furnace axis, thereby causing the hot gases within the furnace chamber to rotate about said axis.

2. The process of claim 1 in which a plurality of such spiraling gas streams are charged into the furnace chamber, the momental direction of the predominant segment of a majority thereof being to the same side of the furnace axis.

3. The process of claim 1 in which the spiraling stream of gas is preformed hot products of combustion.

4. The process of claim 1 in which the spiraling gas stream is an oxidizing gas and a fluid fuel is injected axially through the spiraling stream.

5. The process of claim 1 in which the oxidizing gas is air.

6. The process of claim 1 in which the spiraling gas stream is a gaseous fuel and an oxidizing gas is injected axially through the spiraling stream.

7. The process of claim 1 in which said hydrocarbon is a high molecular weight, highly aromatic hydrocarbon residue and is injected upwardly and coaxially into a vertically elongated cylindrical furnace chamber maintained at a temperature at which the hydrocarbon residue is decomposed to carbon black, and thereby vaporizing and thermally decomposing the hydrocarbon residue to form carbon black and a relatively quiescent blanket of upwardly rising reducing gases into which the entering hydrocarbon residue is injected and in which a rotational motion is imparted to the blanket by the entering gas stream.

8. The process of claim 7 in which the hydrocarbon residue is one having an aromatic content not less than about 65%, by weight, a mean molecular weight within the range from about 100 to about 400 and a UOP characterization factor (K) within the range from about 9 to 10.5.

9. The process of claim 7 in which the hydrocarbon residue is injected into the furnace chamber as an expanding spray of liquid droplets, the spiraling gas stream is an oxidizing gas and a fluid fuel is injected coaxially through the spiraling stream of oxidizing gas and is thereby mixed with the oxidizing gas to form a combustible mixture which is burned to form within the furnace chamber, along the wall thereof, a rotating annulus of hot products of combustion which supplies heat for decomposing the hydrocarbon residue and imparts rotational motion to the blanket.

10. The process of claim 9 in which a portion of the entering fluid fuel is projected into said entering spray of hydrocarbon droplets, to shield the spray from oxidizing gases.

11. Apparatus for producing carbon black by the thermal decomposition of a hydrocarbon which comprises, in combination, a heat insulated, substantially cylindrical furnace chamber, means for injecting a fluid hydrocarbon make into said furnace chamber, at least one cylindrical burner chamber positioned radially with respect to the furnace chamber and opening into one end of said furnace chamber, means for generating within the burner chamber a helically flowing stream of gases and for delivering said gases to the said furnace chamber in an unsymmetrical pattern such that the momental direction of a predominant segment of the gases escaping into the furnace chamber from the confinement of the burner chamber is substantially to one side of the furnace chamber axis and adapted to cause the gases within the furnace chamber to rotate about the furnace chamber axis.

12. The apparatus of claim 11 further characterized by a fluid injector extending coaxially into and, for a substantial distance, through the burner chamber and adapted to inject and effect mixing of the fluid with the spiraling gas stream.

13. The apparatus of claim 11 further characterized in that the burner chamber is symmetrically flared outwardly at its juncture with the furnace chamber.

14. The apparatus of claim 11 in which the furnace chamber is vertically elongated, is provided with an exit vent at its upper end and is provided at its lower end with means for injecting a fluid hydrocarbon make coaxially upwardly into the furnace chamber and a plurality of the burner chamber assemblies spaced about its periphery.

References Cited by the Examiner

UNITED STATES PATENTS 3,003,855   10/1961   Heller et al. _____ 23—209.4
3,116,114   12/1963   Gunnell _____ 23—209.4

OSCAR R. VERTIZ, *Primary Examiner.*

E. J. MEROS, *Assistant Examiner.*